United States Patent
Rogers et al.

(10) Patent No.: US 11,331,168 B2
(45) Date of Patent: May 17, 2022

(54) DENTAL IMPLANT HAVING TAPERED THREADED SURFACE WITH INSTALLATION ENHANCEMENT FEATURES

(71) Applicant: BIOMET 3I, LLC, Palm Beach Gardens, FL (US)

(72) Inventors: Dan P Rogers, Palm Beach Gardens, FL (US); Zachary B Suttin, West Palm Beach, FL (US)

(73) Assignee: Biomet 3i, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/233,655

(22) Filed: Aug. 10, 2016

(65) Prior Publication Data

US 2017/0042645 A1 Feb. 16, 2017

Related U.S. Application Data

(60) Provisional application No. 62/203,645, filed on Aug. 11, 2015.

(51) Int. Cl.
*A61C 8/00* (2006.01)
(52) U.S. Cl.
CPC .......... *A61C 8/0024* (2013.01); *A61C 8/0012* (2013.01); *A61C 8/0022* (2013.01); *A61C 8/0037* (2013.01)
(58) Field of Classification Search
CPC .... A61C 8/0024; A61C 8/0025; A61C 8/0037
See application file for complete search history.

(56) References Cited

U.S. PATENT DOCUMENTS

| 2004/0146834 | A1* | 7/2004 | Haessler | A61B 17/863 |
| | | | | 433/174 |
| 2005/0250074 | A1* | 11/2005 | Lang | A61C 8/0089 |
| | | | | 433/174 |

(Continued)

FOREIGN PATENT DOCUMENTS

| CN | 101889904 A | 11/2010 |
| CN | 102036617 A | 4/2011 |

(Continued)

OTHER PUBLICATIONS

"International Application Serial No. PCT/US2016/046374, International Search Report dated Oct. 14, 2016", 4 pgs.

(Continued)

*Primary Examiner* — Nicholas D Lucchesi

(57) ABSTRACT

A dental implant with a specialized thread arrangement is disclosed. The dental implant includes a cylindrical upper section and a tapered lower section coupled to the cylindrical upper section. A helical thread is located on the exterior surface of the cylindrical upper section and the tapered lower section. A path is defined by the helical thread. The helical thread has a section on the exterior surface of the cylindrical body section and a section on the tapered body section. A cutting tooth is formed on the helical thread where the thread section on the cylindrical body section transitions into the thread section on the tapered body section. The cutting tooth allows minimal torque to be applied to create stability of the implant by cutting into the dense part of the bone.

15 Claims, 2 Drawing Sheets

(56) References Cited

U.S. PATENT DOCUMENTS

| | | | | |
|---|---|---|---|---|
| 2008/0187886 A1* | 8/2008 | Robb | ............... | A61C 8/0022 |
| | | | | 433/174 |
| 2008/0241791 A1* | 10/2008 | Bulard | ............. | A61C 8/0025 |
| | | | | 433/174 |
| 2011/0008753 A1* | 1/2011 | Rupprecht | ......... | A61C 8/0022 |
| | | | | 433/173 |
| 2011/0070558 A1* | 3/2011 | Park | ................. | A61C 8/0025 |
| | | | | 433/174 |
| 2015/0297321 A1* | 10/2015 | Chen | ............... | A61C 8/0025 |
| | | | | 433/174 |
| 2016/0015483 A1* | 1/2016 | Kumar | ............. | A61C 8/0075 |
| | | | | 606/301 |

FOREIGN PATENT DOCUMENTS

| | | | |
|---|---|---|---|
| CN | 202027742 U | 11/2011 | |
| CN | 202078413 U | 12/2011 | |
| CN | 102470023 A | 5/2012 | |
| CN | 103458821 A | 12/2013 | |
| CN | 203388954 U | 1/2014 | |
| CN | 103648430 A | 3/2014 | |
| CN | 107920875 A | 4/2018 | |
| DE | 19828018 A1 | 12/1999 | |
| WO | WO-2010128079 A1 | 11/2010 | |
| WO | WO-2017027604 A1 | 2/2017 | |

OTHER PUBLICATIONS

"International Application Serial No. PCT/US2616/646374, Written Opinion dated Oct. 14, 2016", 7 pgs.

"International Application Serial No. PCT/US2016/046374, International Preliminary Report on Patentability dated Mar. 22, 2018", 9 pgs.

"European Application Serial No. 16753560.8, Response filed Oct. 12, 2018 to Office Action dated Apr. 5, 2018", 15 pgs.

"Chinese Application Serial No. 201680046544.9, Office Action dated Dec. 18, 2019", (W/English Translation), 18 pgs.

"European Application Serial No. 16753560.8, Communication Pursuant to Article 94(3) EPC dated Sep. 30, 2019", 6 pgs'.

"Chinese Application Serial No. 201680046544.9, Office Action dated Jul. 14, 2020", w/English translation, 18 pgs.

"Chinese Application Serial No. 201680046544.9, Response filed Apr. 29, 2020 to Office Action dated Dec. 18, 2019", w/ English claims, 22 pgs.

"Chinese Application Serial No. 201680046544.9, Response filed Sep. 29, 2020 to Office Action dated Jul. 14, 2020", w/ English claims, 10 pgs.

"European Application Serial No. 16753560.8, Response filed Apr. 14, 2020 to Communication Pursuant to Article 94(3) EPC dated Sep. 30, 2019", 18 pgs.

* cited by examiner

DENTAL IMPLANT HAVING TAPERED THREADED SURFACE WITH INSTALLATION ENHANCEMENT FEATURES

CLAIM OF PRIORITY

This application claims the benefit of U.S. Provisional Patent Application Ser. No. 62/203,645, filed on Aug. 11, 2015, the benefit of priority of which is claimed hereby, and which is incorporated by reference herein in its entirety.

TECHNICAL FIELD

This disclosure relates to dental implants and more specifically to an implant with a tapered surface and a helical thread that allows efficient seating of the implant into bone.

BACKGROUND

A well-known procedure is the dental restoration of a partially or wholly edentulous patient with artificial dentition. Typically, a generally cylindrically shaped dental implant is seated into the bone of a patient's jaw in the initial stage of the restoration process. The dental implant includes a socket, e.g., a bore, which is accessible through the overlying or surrounding gum tissue for receiving and supporting one or more attachments or components which, in turn, are useful to fabricate and support prosthodontic restorations. The dental implant generally includes a threaded interior bore to receive a retaining screw for holding mating components thereupon. The seating of the dental implant in relation to the bone is critical as it provides stability for the restoration.

The exterior of an implant is designed to seat and stabilize the implant within the bone in order to anchor the eventual mating component. Generally, an osteotomy is created in the bone via a series of drills and/or taps and/or osteotomies in preparation for the seating of the dental implant. Certain implants include an exterior helical thread that creates a female thread in the sides of the osteotomy by compressing the bone when the implant is seated into the osteotomy. Such implants require relatively high torque to compress the bone via the threads and may not be optimal for the implant and/or the surgical instrument and/or the patient biology. In order to control torque for installation and the resultant stress at the bone-implant interface, it is desirable for the thread diameters to be close to the diameter of the osteotomy. Threads may be cut into the bone by the implant itself termed a "self-tapping" dental implant or by a tapping tool prior to the seating of the implant (or by both).

Known self-tapping dental implants have an exterior surface with a self-tapping thread that has cutting teeth that cut into the sides of the osteotomy to assist in seating the implant as torque is applied to the implant. Thus, the cutting teeth of the thread cut into the bone on the sides of the osteotomy to provide a female thread for seating of the trailing implant threads, and in turn the implant becomes stabilized within the osteotomy. The use of the cutting teeth decreases the required torque to seat the implant. However, the threading on certain dental implants may still cause compressive stresses on the bone as the cutting teeth are typically located lower on the implant and therefore the threads on the upper part of the implant still use compression to cut through the bone to properly seat the implant (assuming the threads on the upper portion are at a diameter that is greater than the lower portion).

Certain implants have a cylindrical portion and are tapered along the length of the implant below the cylindrical portion such that the cylindrical portion of the implant has a greater diameter than the tapered bottom part of the implant inserted in the bone. Since the threads follow the exterior of the implant, the threads along the length of the implant are at different diameters due to the tapering geometry. Such tapered implants require additional care to avoid excessive cutting into the bone by the threads and increased compression as the larger diameter at the top of the implant enters the osteotomy. The placement of the self-tapping features on the threads on the tapered implant exterior is a challenge since the threads allow engagement with the dense bone, but may require additional torque on the implant that may not be optimal for the implant, the surgical instruments, or the patient biology. For example, if the cutting teeth are located above the transition between the cylindrical and tapered sections, some stability is sacrificed, since these teeth eliminate the thread portion but have no function, since the lower thread has already cut away the bone. If the cutting teeth are located below the transition between the cylindrical and tapered sections, the upper part of the thread still cuts via bone compression thereby increasing required torque.

Thus, there is a need for an implant having a self-tapping tapered threaded surface allowing reduced torque when the implant is seated in the bone. There is also a need for an implant with precision threads that allow engagement with dense bone in order to increase implant stability. There is also a need for a tapered implant that includes a specifically placed cutting tooth to allow for full stability for the non-tapered part of the implant yet minimizing bone compression along the same non-tapered part of the implant during placement. There is also a need for a tapered implant that allows the use of idealized osteotomy preparation tools such as drills and/or taps to optimize torque when seating the implant.

BRIEF SUMMARY

An example of the present disclosure is a dental implant including a cylindrical body section and a tapered body section coupled to the cylindrical body section. A helical thread is located on the exterior surfaces of the cylindrical body section and the tapered body section. The helical thread defines a path and has a first section on the cylindrical body section and a second section on the tapered body section. A plurality of self-tapping cutting teeth are located along the second section of the helical thread. The plurality of teeth include an uppermost cutting tooth formed on the helical thread where the first section on the cylindrical body section transitions into the second section on the tapered body section.

Another example disclosed is a self-tapping dental implant including a cylindrical body section and a tapered body section coupled to the cylindrical body section. A helical thread is located on the exterior surfaces of the cylindrical body section and the tapered body section. The helical thread defines a path located with a first section on the cylindrical body section and a second section on the tapered body section. An initial cutting tooth is formed on the helical thread where the first section on the cylindrical body section transitions into the second section on the tapered body section. The cutting tooth is positioned to cut through bone when the dental implant is seated.

Another example is a method of seating an implant in bone. The implant includes a cylindrical section, a tapered section coupled to the cylindrical section, a helical thread member on the exterior surface of the cylindrical section and the tapered section, a path on the cylindrical section and the tapered section defined by the helical thread, and a cutting tooth formed on the helical thread where the thread transitions from the cylindrical section to the tapered section. An osteotomy having a diameter approximately the same as the minor diameter of the cylindrical section of the implant in the bone is created. The implant is seated in the osteotomy. Torque is applied to the implant so the cutting tooth contacts the bone to cut through a dense region of bone to create implant stability via the thread member on the cylindrical section.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figures 1A, 1B, 1C, 1D:
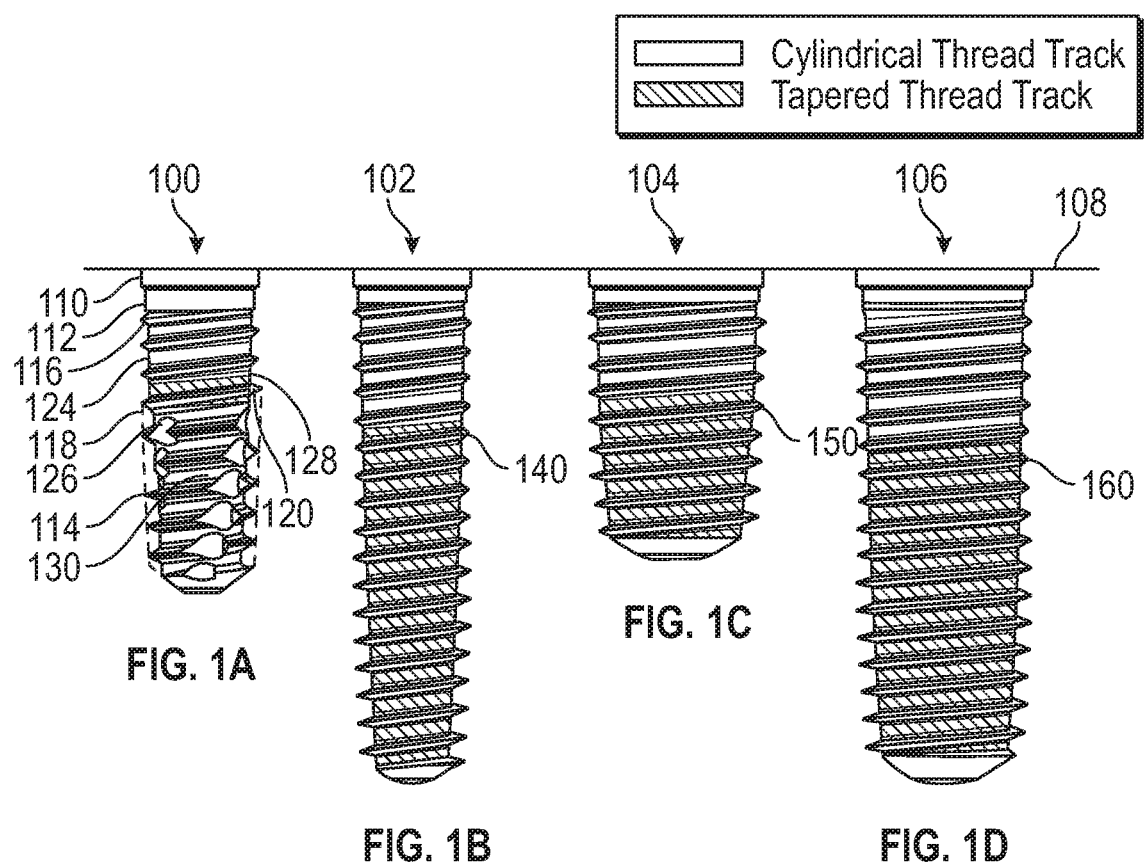
FIG. 1A is a side view of a tapered implant.
FIG. 1B is a side view of a tapered implant.
FIG. 1C is a side view of a tapered implant.
FIG. 1D is a side view of a tapered implant, where each implant of FIGS. 1A-1D has specialized threading with a specifically located initial cutting tooth that is part of the self-tapping feature.
Figures 2A, 2B, 2C, 2D:
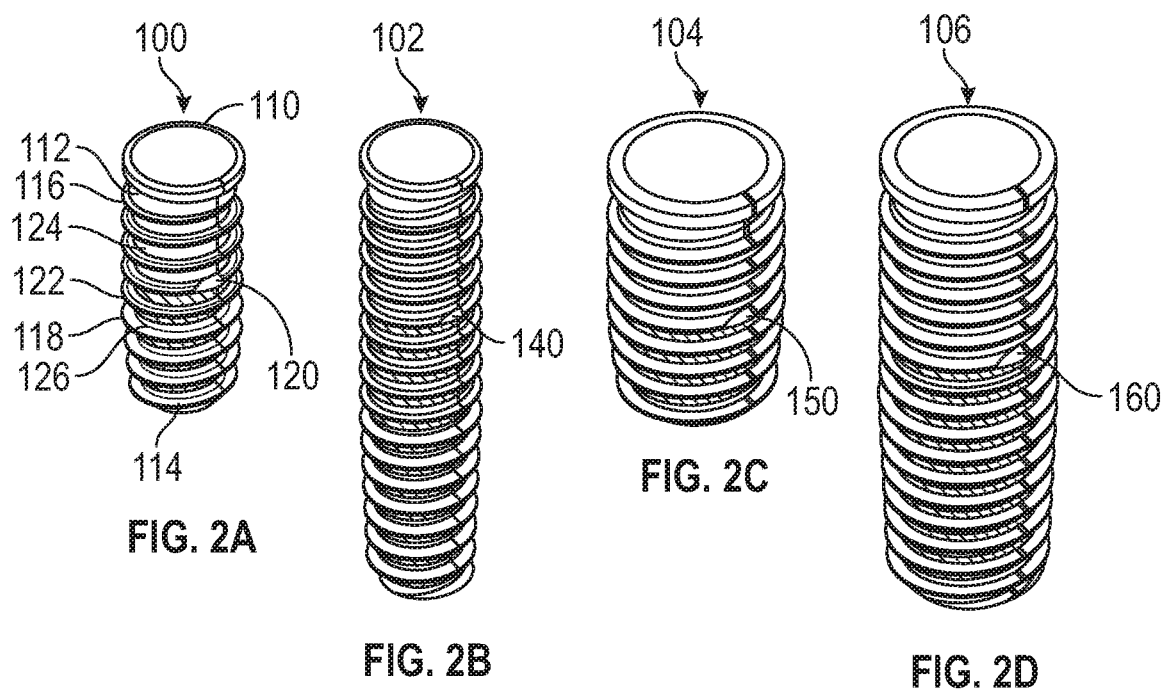
FIG. 2A is a perspective view of the tapered implant in FIG. 1A.
FIG. 2B is a perspective view of the tapered implant in FIG. 1B.
FIG. 2C is a perspective view of the tapered implant in FIG. 2C.
FIG. 2D is a perspective view of the tapered implant in FIG. 2D, where each implant has specialized threading with the specifically located initial cutting tooth.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIGS. 1A-1D illustrate a side view of different sized tapered dental implants 100, 102, 104, and 106. FIGS. 2A-2D illustrate a perspective view of the dental implants 100, 102, 104, and 106 shown in FIG. 1. Each of the implants 100, 102, 104, and 106 is a self-tapping implant designed to be seated in bone. The seating of the implants 100, 102, 104, and 106 is shown relative to a horizontal line 108 that represents the crest of the bone. Each of the implants 100, 102, 104, and 106 has a body having an upper cylindrical section and a lower tapered section. The exterior surfaces of the cylindrical and tapered sections define the minor diameter of the implant. A specialized helical thread is located on the exterior surfaces of the cylindrical and tapered sections. The specialized helical thread defines a major diameter of the implant as will be described below. Each of the implants 100, 102, 104, and 106 may be fabricated from metal, metal alloys, ceramics, and combinations of these materials such as titanium (Ti) and titanium alloys.

The implants 100, 102, 104, and 106 have similar shapes and features to facilitate stability of the implant in the bone and to minimize required torque to seat the implant in the bone. For example, the implant 100 includes a cylindrical body section 112 that is topped by a collar 110 and a tapered body section 114. The tapered body section 114 is coupled to the cylindrical body section 112 opposite the collar 110. A thread path or track 116 is formed between a helical thread 118 that runs continuously on the exterior surface of the cylindrical body section 112 and the tapered body section 114. In this example, the implant 100 has a major diameter of 3.25 mm defined by the diameter of the thread 118 on the cylindrical body section and a length of 8.5 mm defined from the collar 110 to the tip of the tapered body section 114. The thread 118 includes an initial cutting tooth 120 that cuts into the bone when the implant 100 is inserted into an osteotomy that is prepared in the bone. The cutting tooth 120 is defined by a vertical surface cut into the thread 118. A triangular surface 122 is created on the thread 118 that is substantially perpendicular to the vertical surface of the cutting tooth 120. The drills used to create the osteotomy have cutting diameters that are approximately the same as the minor diameters defined by the exterior surface of the cylindrical body section 112 and the tapered body section 114.

The thread track 116 is divided between a cylindrical thread track 124 and a tapered thread track 126 at a transition point 128. As may be seen in FIGS. 1A-1D and FIGS. 2A-2D, the cylindrical thread track 124 is defined by the thread 118 on the cylindrical body section 112. The tapered thread track 126 is defined by the thread 118 on the tapered body section 114. In this example, the cutting tooth 120 is located 3.53 mm from the top of the collar 110. The cutting tooth 120 is thus adjacent to and lies half on the taper side of the junction of the minor diameters of the cylindrical and tapered body sections 112 and 114. The depth of the cutting tooth 120 relative to the length of the implant 100 may be determined based on the values of the upper major diameter of the thread 118 on the cylindrical body section 112, the bottom major diameter of the thread 118 at the bottom of the tapered body section 114, the taper angle of the tapered body section 114, and the overall length of the implant 100.

The cutting tooth 120 thus is located on the thread 118 under the transition point 128 in the track 116. The location of the transition point 128 and therefore the cutting tooth 120 depends on the diameter and length of the implant 100 in order to reduce drag from the thread 118 in relation to the osteotomy prepared in the bone. As shown in FIGS. 1A-1D, additional cutting teeth 130 are located on the thread 118 on the tapered body section 114. The additional cutting teeth 130 provide cutting into the sides of the osteotomy to mate with the thread 118.

The implant 102 has the same configuration as the implant 100 including a cutting tooth 140 at the transition point between the cylindrical track and the tapered track. The implant 102 has a major diameter of 3.25 mm but a length of 15 mm. The transition point on the implant 104 is thus 4.81 mm from the top of the collar as determined by the function described above. The location of the cutting tooth 140 at the transition point allows the tooth 140 to cut the bone for the thread above the tooth 140 to create stability in the dense part of the bone while minimizing required torque. The additional cutting teeth of the implant 102 are omitted for clarity in FIGS. 1A-1D and 2A-2D.

The implant 104 has the same configuration as the implant 100 including a cutting tooth 150 at the transition point between the cylindrical track and the tapered track. The implant 104 has a major diameter of 5.0 mm and a length of 8.5 mm. The transition point on the implant 104 is thus 4.03 mm from the top of the collar as determined by the function described above. The location of the cutting tooth 150 at the transition point allows the tooth 150 to cut the bone for the thread above the tooth 150 to create stability in the dense part of the bone while minimizing required torque. The additional cutting teeth of the implant 104 are omitted for clarity in FIGS. 1A-1D and 2A-2D.

The implant 106 has the same configuration as the implant 100 including a cutting tooth 160 at the transition point between the cylindrical track and the tapered track. The implant 106 has a major diameter of 5.0 mm and a length of 15 mm. The transition point on the implant 104 is thus 5.49 mm from the top of the collar as determined by the function described above. The location of the cutting tooth 160 at the transition point allows the tooth 160 to cut the bone for the thread above the tooth 160 to create stability in the dense part of the bone while minimizing required torque. The additional cutting teeth of the implant 106 are omitted for clarity in FIGS. 1A-1D and 2A-2D.

The dimensions of length and major diameter for the implants described above are by example only. Of course implants having other lengths and major diameters may incorporate the cutting tooth location and thread design described herein. As explained above, each tapered implant such as the example implants 100, 102, 104, and 106, has a theoretical singular position at which the initial cutting tooth may be located in order to eliminate drag from the trailing threads in the dense part of the bone corresponding to the cylindrical body section of the implant. This selection thereby increases efficiency of seating the implant by minimizing required torque while maintaining stability of the seated implant via the self-tapped threads.

As may be seen by the other implants 102, 104, and 106, regardless of the implant diameter or length, the first full-form tooth profile opportunity along the length of an example tapered implants 102, 104, and 106 is always found adjacent to (and on the taper side of) the junction of the minor diameters of the cylindrical and tapered body sections of the respective implants. The succeeding cutting teeth such as the cutting teeth 130 are located on the thread 118 under the initial cutting tooth 120.

Figure 3A:
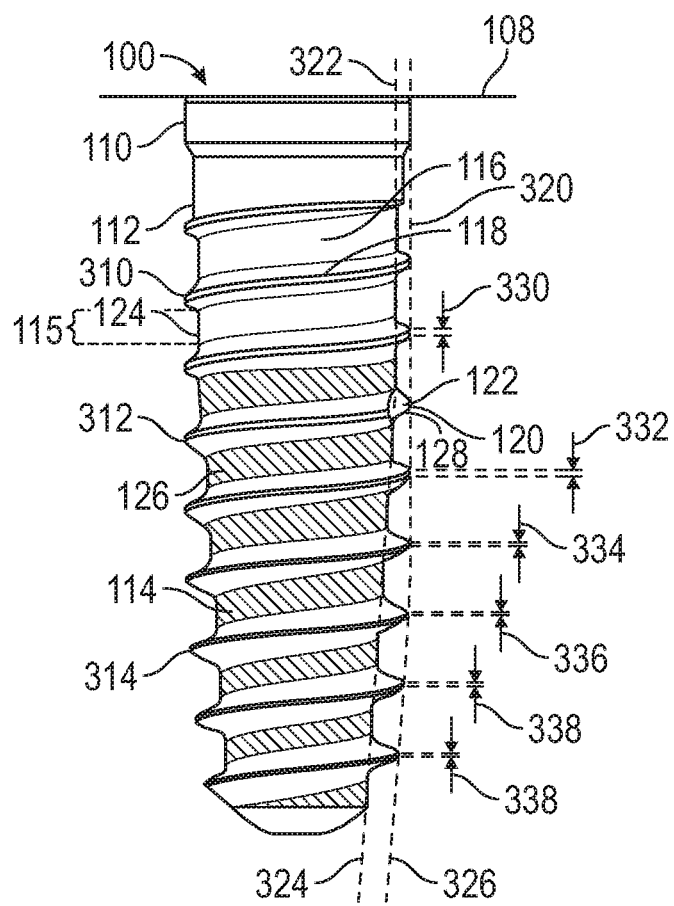
FIG. 3A is a close-up side view of one of the dental implants in FIG. 1.
Figure 3B:
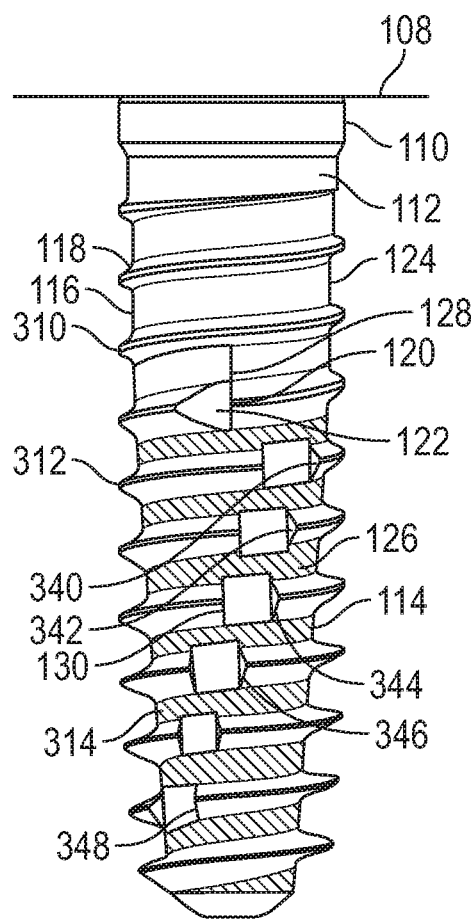
FIG. 3B is a rotated close-up side view of the dental implant in FIG. 3A.
Figure 3C:
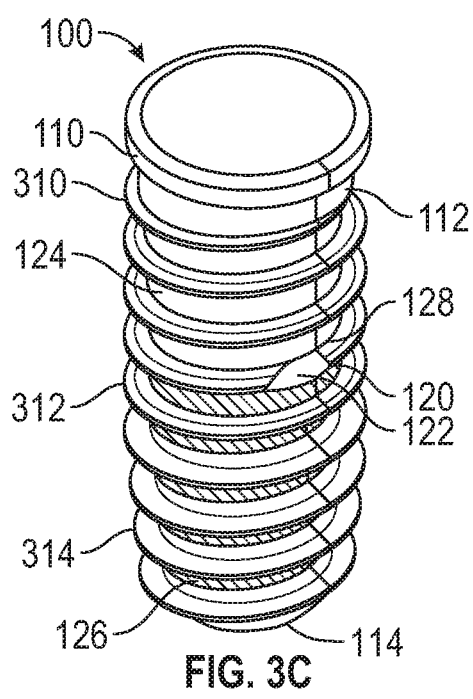
FIG. 3C is a close-up perspective view of the dental implant in FIG. 3A.

FIGS. 3A and 3B are rotated close-up side views of the implant 100 in FIG. 1. FIG. 3C is a close-up perspective view of the implant 100 in FIG. 1. Like elements in FIGS. 3A-3C are assigned the same reference numbers as those in FIGS. 1 and 2. As may be seen in FIGS. 3A-3C, the thread 118 includes a cylindrical thread section 310, an upper tapered thread section 312 and a lower tapered thread section 314. The thread 118 has a roughly triangular shaped cross-section from the respective exterior surface of the implant body. The triangular shaped cross-section of the thread 118 defines the cutting tooth 120 as shown in FIGS. 3A and 3B. The additional cutting teeth 130 are formed in the thread 118 at locations below the initial cutting tooth 120 such as cutting teeth 340, 342, 344, 346, and 348 as shown in FIG. 3B. In this example, the cutting teeth 130 are located in relation to each rotation of the helical thread 118 to provide self-tapping in the wall of the osteotomy to seat the tapered body section 114 via the upper and lower tapered thread sections 312 and 314. The additional cutting teeth 130 are not shown in FIGS. 3A and 3C for clarity.

Each of the thread sections 310, 312, and 314 has a major diameter that is the exterior surface of the thread and a minor diameter that is the location where the thread section joins the implant body. The cylindrical thread section 310 extends from the exterior surface of the cylindrical body section 112. Thus, the minor diameter of the upper tapered thread section 312 is the same as the minor diameter of the cylindrical body section 112. The tapered thread sections 312 and 314 extend from the exterior surface of the tapered body section 114. The transition point 128 indicates the junction of a minor diameter of the cylindrical thread section 310 and the minor diameter of the upper tapered thread section 312. In this example, the major diameter of the thread sections 310 and 312 are the same, as shown by a line 320 representing the major diameter of the thread sections 310 and 312. The minor diameter of the cylindrical thread section 310 is represented by a line 322 that is also the minor diameter of the cylindrical body section 112.

As explained above, the minor diameter of the cylindrical body section 112 is constant. However the minor diameter of the tapered body section 114 changes based on the taper angle as shown by a line 324. The major diameters of the threads of the lower tapered thread section 314 are also tapered at approximately the taper angle represented by a line 326.

As may be seen in FIGS. 3B and 3C, the location of the cutting tooth 120 coincides with the precise point on the thread 118 where the cylindrical thread track 124 meets the tapered thread track 126. The crest width of the thread 118 in the cylindrical thread section 310 is constant as represented by a bracket 330. Along the helical thread 118 below this point, the thread profile of the thread 118 as measured by the thread crest width decreases as a function of the thread profile. The increasing distance relationship between the major diameter and the minor diameter defined by the taper angle represented by the line 324 of the upper tapered thread section 312 causes this reduction in thread crest width shown in FIG. 3A. Since the minor diameter gets progressively smaller due to the taper of the exterior surface of the tapered body section 114 while the major diameter remains constant in the upper tapered thread section 312, the thread crest continues to reduce in width to the point where the major diameter also tapers at the lower tapered thread section 314. The reduction in thread crest may be seen by brackets 332, 334, and 336 that are successively smaller in width based on the location on the thread section 312. Once the major and minor diameters of the thread 118 both taper at the same rate in the lower tapered thread section 314, the thread crest remains constant as represented by brackets 338. This may be seen by the angles of the tapering of the minor and major diameters represented by the lines 324 and 326 in FIG. 3A. Due to the secondary threading cut that passes along the entire length of the implant 100 to thin out the straight thread, the whole region below the convergence point at the transition point 128 where the cutting tooth 120 is located is characterized by complex thread profile geometries of varying widths along the length of the tapered body section 114, while the root width 115 of the thread 118 remains constant as a function of the threading tool shape. The complex geometry of the thread sections 312 and 314 create a wedge effect with the sides of the osteotomy corresponding to the tapered body section 114 of the implant to generate stability for the seating of the implant 100.

The major and minor diameters remain constant above the transition point 128 and hence the thread profile of the cylindrical thread section 310 (as expressed by a constant crest width) also remains constant. The single tooth 120 at the transition point 128, therefore, cuts the full profile of thread 118 into the wall of the bone corresponding to the cylindrical body section 112 for the remainder of the cylindrical thread section 310 to follow until full seating of the implant 100 occurs in the osteotomy. This virtually eliminates any wedging of the full-form thread 118 of the cylindrical body section 112 into the wall of the cortical bone.

The osteotomy location for the implant 100 is selected in order to increase bone to implant contact to increase implant stability but also minimize the torque necessary to seat the implant 100. To increase stability of the implant, appropriate drills may be selected to create the osteotomy to seat the implant 100. Typically a starter drill is used to locate where the implant 100 will be placed. A second drill with a cutting diameter smaller than the final drill shape is used to excavate the site of the bulk of the bone to be removed. A final drill has a cutting diameter and shape that matches the minor diameter of the cylindrical body section 112. The location of the cutting tooth 120 at the point where the cylindrical thread track 124 meets the tapered thread track 126 increases placement efficiency without detracting from the implant stability. Drills of differing cutting diameters may be used to create osteotomies appropriate for the different dimensioned implants 102, 104, and 106 in FIGS. 1A-1D or implants of other dimensions.

Sometimes, the bone surrounding the osteotomy is so dense that the torque required to drive the implant cutting features overcomes the strength of the driving features of the implant, leading to damage and an inability to fully place the implant. In order to reduce this torque requirement, the site may be pre-tapped with a bone tap designed to remove the majority of the bone material in the internal thread track, leaving behind a small amount of bone for the implant itself to remove thereby requiring a greatly reduced amount of input torque. Thus, optimal stability may be achieved by using load sharing taps that create slightly undersized threads (vs. line to line with the implant macro-geometry) so as to make the implant 100 perform some work in cutting into the dense bone. While dense bone offers the greatest potential for high primary stability, known implants do not take full advantage of the dense bone for seating the implant because the osteotomies produced by the corresponding drill for use in dense bone are oftentimes designed to remove a greater amount of bone, leaving a significantly larger diameter than the minor diameter of the implant. While this reduces the required torque to fully seat the implant, it also reduces significantly the initial bone to implant contact, which is so desirable for primary stability and optimal osseointegration. The disclosed implant 100 allows the creation of a tap to reduce the extremely high torques that would otherwise occur, but not so much that high stability that may be created in dense bone is sacrificed. The load sharing taps created for the implant 100 provide for a high primary stability and high efficiency based on the thread 118 and elimination of unnecessary cutting of dense bone by the implant requiring excessive torque.

The implant 100 also allows for shorter collar length of the collar 110 relative to known implants. The collar 110 by itself does nothing to contribute to the stability because it is not anchored into the bone as it does not have threads. The starting location of the thread 118 on the cylindrical body section 112 relative to the crest 108 in FIG. 1 is relatively high. Thus, the thread 118 at the cylindrical body section 112 may contact the best quality dense bone for stability of the implant 100. By moving the threads 118 up on the length of the implant 100, the threads 118 are able to bite into the cortical bone in contrast to cancellous or mushy bone, and this in turn increases the stability of the seated implant 100.

While the description above applies specifically to individual teeth cut into and along the helical length of the thread, there exists no restriction to the essence of the disclosed examples applying to other forms of tooth creation, such that the origin point of multiple teeth formed by a single cut into the length of the implant would lie at the same place as the description below is for a solitary tooth location, and, in fact, may even apply to a minimum of only one tooth should the implant be so designed. In such iterations, it is understood that the resultant shape of the surface 122 will be a function of the method of tooth creation and hence may differ somewhat from the triangular shape in the embodiments previously described.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A dental implant comprising:
   a cylindrical body section having a body diameter that is constant;
   a tapered body section coupled to the cylindrical body section;
   a helical thread on exterior surfaces of the cylindrical body section and the tapered body section, the helical thread defining a path, the helical thread having a first section on the cylindrical body section, a second section on an upper portion of the tapered body section, and a third section on a lower portion of the tapered body section, the second section being positioned between and adjacent to the first and third sections, and wherein the upper portion and the lower portion of the tapered body section are adjacent to each other; and
   a plurality of self-tapping cutting teeth along the helical thread, including an uppermost cutting tooth formed on the helical thread where the first section on the cylindrical body section transitions into the second section on the tapered body section,
   wherein a first maximum diameter of the first section and a second maximum diameter of the second section of the helical thread are constant and equal to each other along a total length of the first section and the second section,
   wherein a third maximum diameter of the third section of the helical thread is adjacent to the second section of the helical thread, and
   wherein the third section continually tapers from the third maximum diameter, adjacent the second section, toward an apical end of the tapered body section.

2. The dental implant of claim 1, wherein the dental implant is fabricated from titanium or titanium alloy.

3. The dental implant of claim 1, wherein an angle that the third maximum diameter of the second section of the helical thread is tapered is the same as an angle of the tapered body section.

4. The dental implant of claim 1, wherein the helical thread has a constant root width and a constant crest width in the cylindrical body section and a first variable crest width in the second section.

5. The dental implant of claim 4, wherein the first variable crest width of the helical thread decreases in the second section between the first section and the third section and wherein the helical thread in the third section has a second variable width that decreases in the third section from the second section toward the apical end.

6. The dental implant of claim 4, wherein the first section on the cylindrical body section transitions into the second section on the tapered body section at a point of a junction of minor diameters of the tapered body section and the cylindrical body section.

7. A self-tapping dental implant comprising:
a cylindrical body section;
a tapered body section coupled to the cylindrical body section at a junction point;
a helical thread on exterior surfaces of the cylindrical body section and the tapered body, section, the helical thread defining a path located with a first section on the cylindrical body section and a second section on the tapered body section; and
an initial cutting tooth formed on the helical thread where the first section on the cylindrical body section transitions into the second section on the tapered body section; the initial cutting tooth positioned to cut through bone when the self-tapping dental implant is seated, wherein the initial cutting tooth is adjacent to the junction point and has a first portion on the tapered body section and a second portion on the cylindrical body section.

8. The self-tapping dental implant of claim 7, wherein the first portion is a first half of the initial cutting tooth and the second portion is a second half of the initial cutting tooth.

9. A method of seating an implant in bone, the implant including a cylindrical section, a tapered section having a continuous taper coupled to the cylindrical section, a helical thread member on an exterior surface of the cylindrical section and the tapered section, a path on the cylindrical section and the tapered section defined by the helical thread, and a cutting tooth formed on the helical thread where the helical thread transitions from the cylindrical section to the tapered section, the method comprising:
creating an osteotomy having a diameter the same as a minor diameter of the cylindrical section of the implant in the bone;
seating the implant in the osteotomy; and
applying torque to the implant so the cutting tooth contacts the bone to cut through a dense region of bone to create implant stability via the thread member on the cylindrical section, wherein the helical thread includes a first section along the cylindrical section of the implant and a second section and a third section along the tapered section of the implant, wherein a first maximum diameter of the first section and a second maximum diameter of the second section of the helical thread are constant and equal to each other along a total length of the first section and the second section, and wherein a third maximum diameter of the third section of the helical thread is adjacent to the second section of the helical thread, and
wherein the third section continually tapers from the third maximum diameter, adjacent the second section, toward an apical end of the tapered body section.

10. The method of claim 9, wherein the implant is fabricated from titanium or titanium alloy.

11. The method of claim 9, wherein an angle that the third maximum diameter of the third section of the helical thread is tapered is the same as an angle of the tapered body section of the implant.

12. The method of claim 9, wherein the helical thread has a constant root width and a constant crest width in the first section and a variable crest width in the second section.

13. The method of claim 12, wherein the crest width of the helical thread decreases in the second section between the first section and the third section and wherein the crest width of the helical thread is constant in the third section.

14. The method of claim 12, wherein the first section on the cylindrical body section transitions into the second section on the tapered body section at a point of a junction of minor diameters of the tapered body section and the cylindrical body section.

15. The method of claim 9, further comprising pre-tapping the osteotomy with a bone tap.

* * * * *